Jan. 14, 1964  A. C. STEWART  3,117,802
MANUALLY POWERED UNIT FOR DRIVING A WHEEL CHAIR
Filed Aug. 18, 1961  2 Sheets-Sheet 1

INVENTOR.
AARON C. STEWART
BY *Albert M. Herzig*
ATTORNEYS.

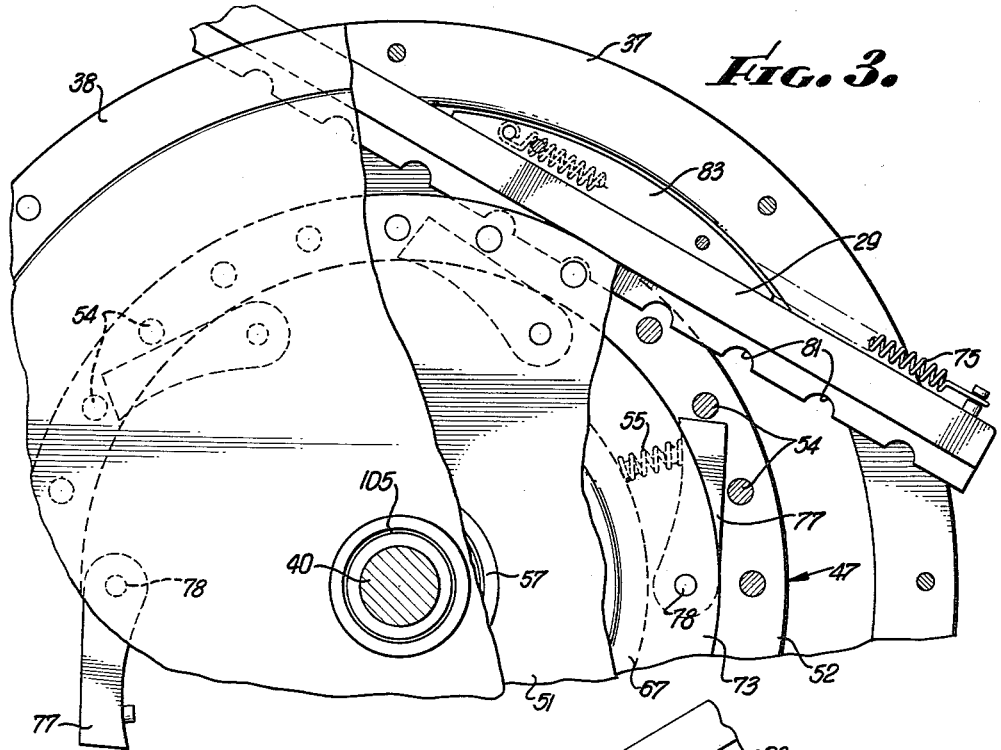
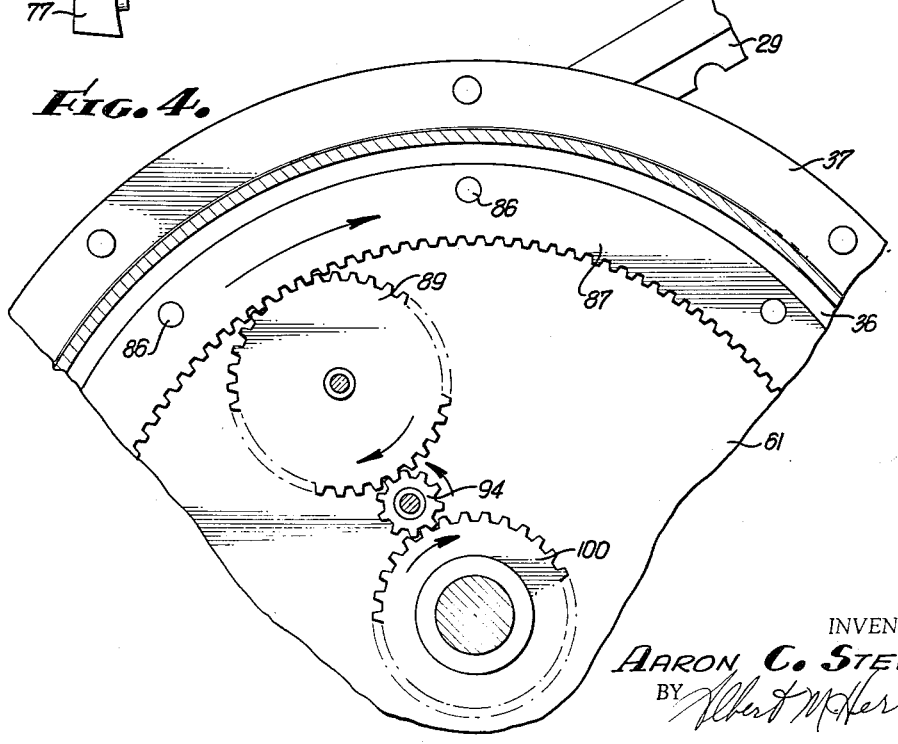

United States Patent Office 3,117,802
Patented Jan. 14, 1964

3,117,802
MANUALLY POWERED UNIT FOR DRIVING
A WHEEL CHAIR
Aaron C. Stewart, 450½ E. 129th St., Hawthorne, Calif.
Filed Aug. 18, 1961, Ser. No. 132,493
8 Claims. (Cl. 280—254)

This invention relates to an improved and simplified driving or power unit adapted for producing rotary motion or power from reciprocatory movement. The device is particularly adaptable for producing rotary drive or power manually. The device has many applications including the drive of wheeled vehicles and the like. The invention embraces the drive of a wheel chair wherein the power unit of the invention is driven by means of pivotal movement of the back of the wheel chair.

In a preferred form of the invention, it is a generally cylindrical compact unit mounted on a central shaft which is driven by the unit. One or more wheels may be on the driven shaft. The unit is secured so as to not itself rotate. Mounting supports may be provided for the shaft.

A first rotary member or wheel is mounted to be freely rotatable with respect to the shaft and this rotary member is rotated by a reciprocating actuator engageable with the rotary member. A second rotary member is mounted to be rotatable with respect to the shaft and has pawls engageable with the first rotary member to have rotary movement imparted thereto. In the preferred form of the invention, the second rotary member is so constructed as to be within the first, as will be described in detail hereinafter.

The second rotary member drives the central shaft and preferably this is by way of a gear train interposed between an internal gear on the second rotary member and a gear on the shaft. The result of this arrangement is that the drive is free wheeling; the rotating parts are mounted on bearings to rotate with a minimum of friction and the entire device is very compact and so constructed as to be easy to fabricate and produce. The device may be mounted on any shaft and secured against rotation for driving the shaft.

The primary object of the invention is to provide an improved, simplified, but very compact and effective driving unit to be driven by reciprocatory movement, as described in the foregoing.

Another object of the invention is to provide a unit, as in the foregoing, wherein rotary driving and driven members are mounted to be rotatable with respect to a shaft, the second rotary member being driven by pawl means in one direction by the first rotary member and the second rotary member being connected to drive the shaft.

Another object is to provide a unit, as in the foregoing, wherein the rotary members and driving connection to the shaft are within a relatively compact housing mounted on the shaft, the housing being held against rotation.

Another object is to provide a unit, as in the foregoing, including an internal gear carried by the second rotary member, a gear on the shaft and gears carried by the housing interposed between the internal gear and the gear on the shaft for driving it.

Another object is to provide improved construction in a unit, as in the foregoing objects, wherein the first rotary member comprises spaced discs having equally spaced pins extending between them adjacent their peripheries engageable by an actuator; and a driven rotary member in the form of a disc between the discs of the first member and having pawls engageable with the pins of the first rotary member.

Another object is to provide an improved wheel chair drive wherein the chair is propelled by the power unit of the invention actuated by a pivoted back on the chair.

Further objects and additional advantages will become apparent from the following detailed description, claims and annexed drawings wherein:

FIG. 3 is a partial sectional view taken along the line 3—3 of FIG. 2;

FIG. 4 is a partial sectional view taken along the line 4—4 of FIG. 2.

Figure 1:
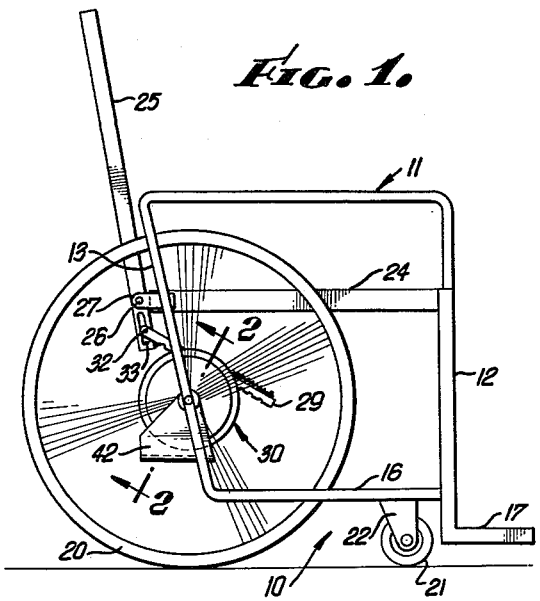
FIG. 1 is a diagrammatic view of a wheel chair having a power unit driven by the back of the chair which is pivoted.

Referring now more in detail to FIG. 1 of the drawings, this figure shows generally a wheel chair 10 which may be of generally conventional construction. It comprises a frame as shown as 11, having front uprights 12 and rear slanted uprights or columns 13. It has lower transverse members 16 and a footrest 17. It has relatively large rear wheels 20 journalled on an axle mounted between the rear members 13. It has smaller front wheels 21 journalled on an axle extending between supports 22.

The wheel chair has a seat 24 and a back 25 which is pivoted on a shaft 26 extending between supports 27 extending from the seat of the chair. The lower part of the back 25 is pivotally connected to the actuator member 29 of the power or drive unit, as shown at 30 which will presently be described in detail. The pivotal connection of the actuator 29, as shown at 32 is to a slot 33 in the lower part of the back 25. The reciprocating movements of the actuator 29 drive the shaft or axle of the wheels 20 in one direction for propelling the wheel chair. The back 25 is oscillated or rocked by the person in the wheel chair and the oscillation of the back may have any degree of amplitude as will be apparent from the description hereinafter. Thus, the chair may be driven by an occupant or patient who is largely immobilized and may, in fact, be a paraplegic, the drive resulting from whatever movements the occupant is able to impart to the back 25. Thus, the device is highly useful for people who have lost a large degree of their muscular strength, and ability to manipulate and control their limbs and other muscles of their body.

Figure 2:
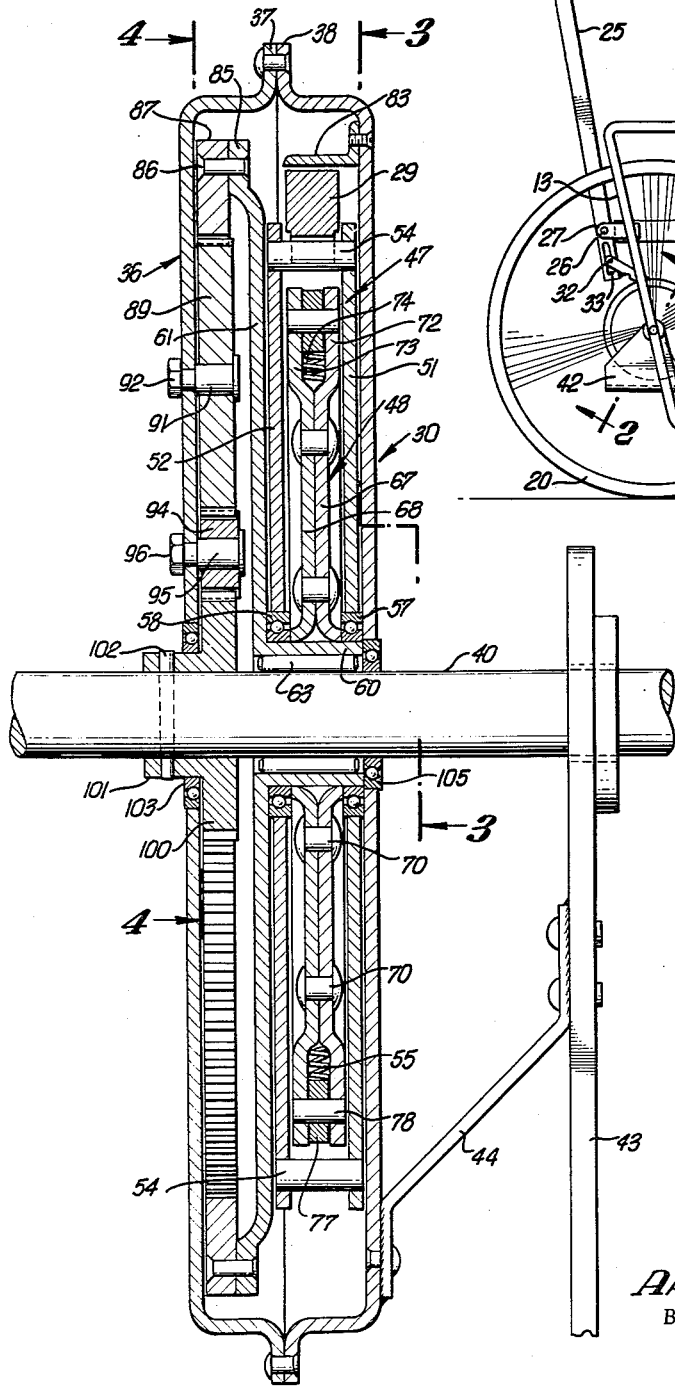
FIG. 2 is a sectional view of a preferred form of the power unit.

FIG. 2 is a cross-sectional view of a preferred form of the driving unit 30. Preferably, it is formed within a circular housing 36 formed in two parts having flanges, as shown at 37 and 38 which are riveted together as shown.

The unit is mounted on a shaft or axle 40 and it may be supported from a base, having uprights 42 and 43, as shown. The housing 36 is held against rotation by one or more brackets 44.

The actuator or actuating bar 29 drives a first wheel or rotary member designated generally at 47. This rotary member, in turn, drives a second rotary member 48, as will be described in detail hereinafter.

The rotary member 47 in a preferred form of the invention comprises spaced discs 51 and 52 and between the peripheral parts of these discs are a plurality of equally spaced pins, as designated at 54 and as may be clearly seen in FIG. 3. The rotary member 47, formed of the discs 51 and 52, is rotatable about bearings 57 and 58 fitting on the outside of a hub or bushing 60 on one side of a disc 61. The disc 61 and its hub 60 are rotatable with respect to the shaft 40, being journalled thereon by way of needle bearings or roller bearings 63 interposed between the hub 60 and the shaft 40.

The second rotary member 48, in a preferred form of the invention, comprises discs 67 and 68 attached together by rivets, as shown at 70. The peripheral parts of these discs are spaced apart, as shown at 72 and 73 to form a space designated at 74. In this space there are a plurality of equally angularly spaced pawls, as designated at 77 in FIG. 3, which are pivoted on pins 78 extending between the parts 72 and 73. These pawls are able to swing outwardly to engage with the pins 54 under the influence of springs 55 in the manner of a pawl and ratchet mechanism, as will be described. The actuator bar 29 has equally spaced rounded openings or depressions 81 which are engageable with the pins 54. The bar or actuator 29 is mounted in a guide in the housing 36, the upper part of which is designated at 83 in FIG. 2, the inner part of the bar 29 fitting between the peripheral edges of the discs 51 and 52, as shown. The bar 29 extends to the exterior of the housing 36 through a suitable opening, and is biased in one direction by spring 75.

The second rotary member 48 is also rotatable with respect to the shaft 40 but it is connected to and rotates with the hub 60 and disc 61, that is, it drives the disc 61. The periphery of the disc 61 is offset outwardly, as designated at 85 and secured to this offset part by means of rivets, as shown at 86, is a ring gear or internal gear 87. The ring gear 87 meshes with a gear 89 journalled on an axle or stem 91 supported by the side of the housing 36 and secured by a nut 92. The gear 89 meshes with a smaller gear 94 mounted on an axle or stem 95 supported by the side of the housing 36 and secured by a nut 96. The gear 94 meshes with a gear 100 having a hub 101 secured to the shaft 40 by a pin 102. The hub 101 rotates in a bearing 103 in a central opening in the side of the housing 36. Numeral 105 designates a similar bearing on the other side of the housing around the shaft 40.

From the foregoing, those skilled in the art will understand the operation of the invention. The actuator or bar 29 may be reciprocated by any means to produce rotary motion for any purpose. In the device of FIG. 1, it is reciprocated by the back 25 of the wheel chair to produce the rotary drive.

When the bar 29 is reciprocated, it engages the pins 54 of rotary member 47 to rotate it back and forth as the bar 29 is reciprocated. As the rotary member 47 rotates in one direction, the pins 54 engages the ends of the pawls 77 and rotary motion is transmitted to the inner rotary member 47. The pawls move outwardly to engage the pins 54 under the influence of their springs. When the rotary member 47 is rotated in the other direction, the pins 54 freely pass the pawls without driving the rotary member 74.

As the rotary member 47 is rotated, it drives the disc 61 and ring gear 87. This gear, in turn, through the gears 89 and 94 drives the gear 100 and consequently the shaft 40 and the wheels mounted thereon. As may be seen, the drive is free wheeling in that the driven rotary member 47 is free to continue rotating when reciprocatory movement is not being imparted to the actuator 29. The driven rotary member 48 is not directly connected to the shaft 40 but drives it through the gear train. The axles of the gears of the gear train are along a radius of the assembly whereby an extremely compact but effective drive unit is realized. It should be noted that the unit with its housing can be mounted on any shaft and the housing held against rotation by any suitable means, or it may be otherwise coupled to any shaft. The device can be built to have any desired ratio of speeds. By reason of the free wheeling arrangement and bearing mountings, there is very little friction in the device so that the reciprocatory movement is converted to rotary power with ease. The particular construction of the rotary driving member and the rotary driven member provides for further compactness and additionally contributes to ease and simplicity of fabrication, production and assembly. The construction also is of a type which is not readily susceptible to wear and virtually no maintenance is required. With reference to the device of FIG. 1, as explained in the foregoing, it makes possible the drive of a wheel chair by a person who may be virtually totally incapacitated. As will be readily understood by those skilled in the art, the power unit of the invention may be utilized in many different environments and many different types of service, including the drive of many types of wheeled vehicles. The device is particularly adaptable to the drive of many different forms of children's wheeled toys including toys of the type that are large enough for the child to ride on. No skill is required in operation of the toy and its manner of construction is such that a child has sufficient strength to operate it.

The foregoing disclosure is illustrative of preferred formed of the invention and is to be interpreted in an illustrative rather than a limiting sense, the invention to be accorded the full scope of the claims appended hereto.

What is claimed is:

1. A compact drive unit for rotating a shaft, said drive unit comprising the combination of a housing, means for supporting said housing disposed about the shaft, a first rotary member disposed within said housing and adapted to be rotatably supported on the shaft, a second rotary member disposed within said housing and adapted to be rotatable supported on the shaft, a reciprocable member extending into said housing, means between said reciprocable member and said second rotary member for translating reciprocating motion of the former into rotary motion of the latter, ratchet means between said first and second rotary members for transmitting unidirectional rotary motion to said first rotary member incident to rotation of said second rotary member in one direction but not in the opposite direction, a compact gear train within said housing in driving engagement with said first rotary member and adapted to rotate the shaft incident to said rotation of said first rotary member.

2. A drive unit as called for in claim 1, wherein said gear train includes an internal gear driven by said first rotary member, a drive gear adapted to be fixed on the shaft, and at least one intermediate gear between said internal gear and said drive gear.

3. A manually operated power drive unit comprising a shaft, a first rotary member freely mounted on said shaft, said first rotary member comprising a pair of discs having a plurality of equally angularly spaced pawls pivotally mounted between peripheral parts of the said discs, a second rotary member freely mounted on the shaft, said second member comprising discs having a plurality of equally angularly spaced pins extending between peripheral parts of the discs, an actuator mounted for longitudinal reciprocatory movement, said actuator having equally spaced rounded groves therein shaped to engage with the pins on said second member for converting the reciprocatory movement of said actuator to rotary movement of said second member, whereby upon reciprocatory movement of said actuator the pawls of the said first rotary member engage the pins for rotating said first rotary member, and drive means interposed between said first rotary member and said shaft.

4. A device as in claim 3, including a gear on said shaft, an internal gear driven by said first rotary member, and gear train means interposed between said internal gear and said gear on said shaft.

5. A device as in claim 3, in combination with a wheeled vehicle having a part thereof mounted for back and forth movement, and means connected between said part and said actuator for providing the drive for the vehicle.

6. A device as in claim 5, wherein said vehicle is a wheel chair having a seat and a back therefor, said back being pivotally mounted whereby it may be oscillated about its mounting, and linkage means connecting a part of said back to said actuator for providing the drive for said wheel chair.

7. A manually powered driving unit comprising a shaft, a first rotary member mounted thereon and rotatable with respect to said shaft, said first rotary member having a plurality of pawls thereon equally spaced around its circumference, a second rotary member mounted on said shaft, an actuator mounted for a longitudinal reciprocatory movement relative to said second rotary member, and means providing engagement between said actuator and said second rotary member, so that reciprocatory movement of said actuator rotates said second rotary member, and said pawls on said first rotary member being adapted and arranged to engage said second rotary member as said second rotary member rotates in one direction but not in the other, whereby reciprocatory movement of said actuator is transformed into rotary movement of said first rotary member, said drive unit including a gear train interposed between said first rotary member and said shaft for driving said shaft.

8. A drive unit as called for in claim 7, wherein said gear train comprises an internal gear in driving relationship with said first rotary member, a gear fixed to said shaft, and at least one gear interposed between said internal gear and said gear on said shaft.

References Cited in the file of this patent

UNITED STATES PATENTS

| | | |
|---|---|---|
| 295,333 | Beaupain | Mar. 18, 1884 |
| 609,077 | Brown | Aug. 16, 1898 |
| 931,803 | Rupley | Aug. 24, 1909 |
| 1,286,099 | Rae | Nov. 26, 1918 |
| 1,349,470 | Muller | Aug. 10, 1920 |
| 1,659,766 | Cevolani | Feb. 21, 1928 |
| 2,509,161 | Meyers | May 23, 1950 |
| 2,630,333 | Petersen | Mar. 3, 1953 |
| 2,723,131 | McChesney | Nov. 8, 1955 |
| 2,831,703 | Shrimpton | Apr. 22, 1958 |